United States Patent Office 3,007,414
Patented Nov. 7, 1961

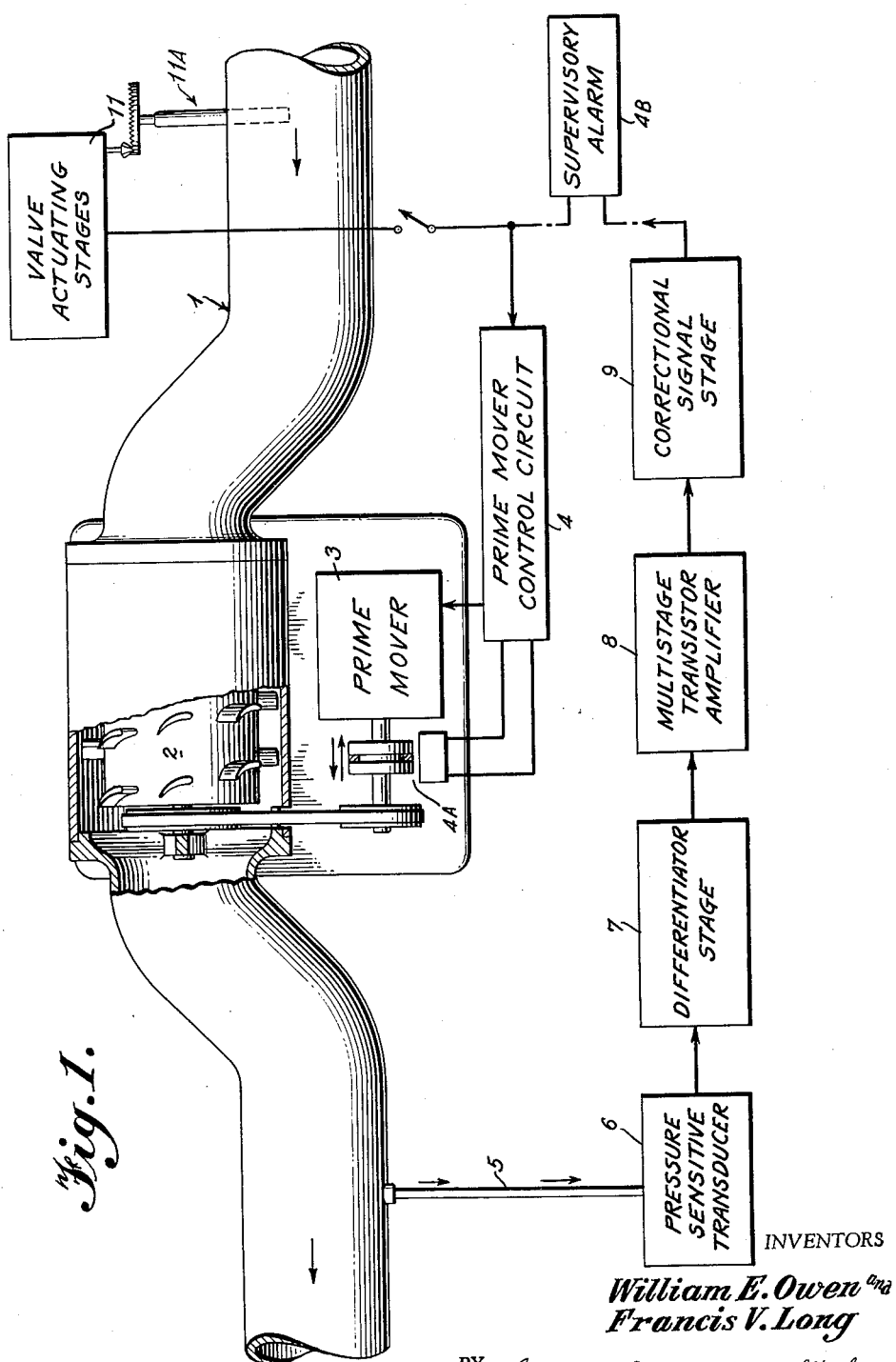

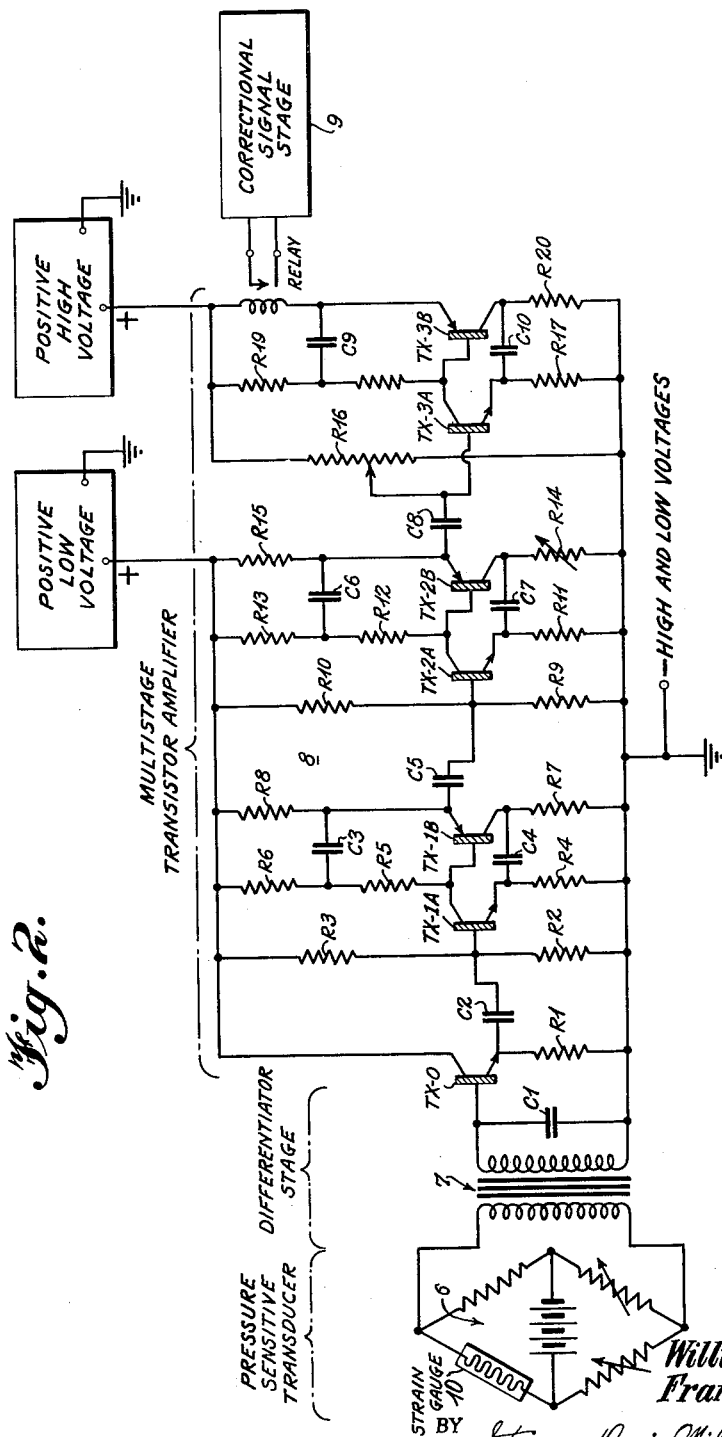

3,007,414
CONTROL SYSTEM FOR PRESSURIZED
CONDUITS
Francis Vinton Long, Box 1612, Shreveport, and William
E. Owen, Baton Rouge, La.; said Owen assignor to
said Long
Filed Nov. 7, 1956, Ser. No. 620,898
5 Claims. (Cl. 103—12)

This invention relates to control systems, and more particularly to a control system for detecting and eliminating undesirable pressure oscillations in pressurized conduits used for conveying fluid or gaseous materials.

In cross country pipeline systems it is common for repetitive pressure surges or oscillations to occur within the component pipelines of the system. Under certain circumstances, it is possible to simulate these surges, and study their effects. For instance, in a conventional gas compressor station employing 2000 hp. polyphase induction motors to drive a group of 5525 c.f.m. centrifugal blowers, an involuntary condition that may be simulated by the closure of a value in the suction line may cause the build up of sustained pressure oscillations within the pipeline. Under certain conditions, the amplitude of such oscillations may reach a value high enough to damage the compressor equipment as well as the associated piping and auxiliaries of the station.

In fluid carrying pipelines the oscillations are usually an indication of the occurrence of the well known undesirable cavitation phenomena.

It will be obvious that a control system capable of detecting such pressure oscillations and accomplishing corrective action would represent an invaluable addition to present day pipeline instrumentation.

The present invention contemplates an ingenious transistorized control system which responds to all oscillations within a pressurized conduit above 2 cycles per second for the entire range of possibly destructive pressure amplitudes detectable by using the invention. By use of the present invention, either dangerous surge or cavitation conditions may be readily detected in the initial stages. Pump or compressor installations may be automatically protected by energizing a supervisory alarm and correcting conditions well before such oscillations reach dangerous amplitude.

Accordingly, therefore, a primary object of this invention is to disclose a novel transistorized control system for detecting and eliminating dangerous pressure oscillations within pressurized conduits employed in gas and liquid pipeline installations.

Another object of the present invention is to teach a method and means for eliminating the hazard to pumping equipment occasioned by high-amplitude pressure oscillations within a pressurized conduit.

Another object of the present invention is to teach a method and means whereby dangerous surge or cavitation conditions within a pressurized conduit are distinguished from non-harmful transients or ordered variations within the pipeline and associated equipment.

Another object of the present invention is to disclose a novel combination of circuitry and components for initiating corrective action in response to receipt of pressure oscillations above a pre-set frequency.

Another object of the present invention is to teach a novel transistorized system which is insensitive to pressure oscillations below a predetermined value, and which eliminates surging or cavitation conditions signalled by receipt of oscillations above said predetermined frequency.

Still another object of the present invention is to disclose the circuits and components for a compact transistorized control system having minimum input power and maintenance requirements.

A further object of the present invention is to teach an ingenious series of cascaded amplifier stages employing pairs of complementary junction type transistors.

A further object of the present invention is to teach the construction of a stabilized low frequency amplifier which exploits the advantages inherent in using complementary pairs of plural element transistors to obtain high voltage gain.

A still further object of the present invention is to disclose an efficient method and means for exploiting transistor circuitry in pressurized pipeline instrumentation.

These and other further objects of the present invention will become apparent through reference to the following detailed description and drawings, in which like numerals indicate like parts and in which:

FIGURE 1 illustrates diagrammatically the interrelationship between a pipeline compressor or pumping station and the components employed in the feedback control system of the present invention.

FIGURE 2 illustrates in schematic form the circuitry and components of the pressure sensitive transducer, the differentiator stage, and the multistage transistor amplifier which are used to feed the correctional signal stage.

Turning now to the drawings, and more particularly to FIGURE 1, the numeral 1 indicates generally a pressurized pipeline or conduit. The conduit 1 is provided with a conventional axial pump or compressor 2, which has a plurality of radially disposed blade-like members mounted in the periphery thereof. It will be appreciated that the numeral 2 may indicate equally well any of the commercially available units such as radial flow centrifugal pumps or compressors. The pump or compressor 2 is connected to receive torque from a suitable prime mover 3. The prime mover 3 may comprise any suitable type of conventional drive means capable of producing a controllable degree of output torque. For instance, the prime mover may comprise a gas turbine characterized by the ability to rotate the compressor at a speed governed by the response of the prime mover control circuit 4 to the output signals from the correctional signal equipment. Alternatively, prime mover 3 may comprise a conventional polyphase induction motor, or the like, which is supplied electrical energy at a rate controlled by the control circuit 4. In order to signal the periods during which corrective action is taken, a supervisory alarm 4B is connected to respond to the output of the correctional signal stage. In the case of unattended remote stations, the supervisory alarm signal may, of course, be telemetered to personnel at an attended station.

The drive supplied to compressor 2 may be of the readily interruptable type. More particularly, an electrically operable clutch 4A is mechanically interposed between the compressor 2 and prime mover 3. The clutch 4A is connected to sample the potentials developed within the control 4, and operate upon sensing a pre-set voltage value therein. In other words, the clutch 4A is electrically biased to completely de-activate the compressor when the undesirable oscillations reach or exceed a pre-set magnitude. It will thus be obvious that the prime mover 3 not only receives a speed control signal from the feedback control system, but also receives an automatic shutdown signal under certain conditions of surge or cavitation, as the case may be.

Under certain circumstances, the regulation or complete elimination of the pressure head across the compressor may not terminate the undesirable conditions at the optimum rate, and additional measures are required.

The valve actuation stage 11 provides such additional remedial action. The stage 11 may generically include such electrically responsive components as are necessary to change the magnitude or direction of the pressurized fluid or gas within the conduit. For instance, the stage 11 may include conventional solenoid actuators for blow-down or by-pass valves. Similar actuators may be located within the unit 11 for energizing recycling valves, or suction and discharge valves, as circumstances may require. The valve control may take the form of a valve 11A shown diagrammatically in FIGURE 1 which may be operated by a suitable drive source.

If desired, stage 11 may include electrically responsive components capable of being electrically biased to snap the respective valves to full-open or full-closed, as the case may be, upon receipt of a predetermined value of voltage from the correctional signal stage.

From the foregoing it will be evident that the corrective action may include such changes in the prime mover control and/or associated pump conditions as reduce or eliminate the unwanted pulsations, while maintaining operations. However, in the ultimate case, proper biasing of the clutch 4A or valve actuating stage 11 can abruptly shut down the unit and entirely remove it from service to clear the condition.

To the left of FIGURE 1 there is shown a tap-off 5 which is connected to sample the pressure within the conduit on the downstream or exhaust side of the compressor or pump 2. The tap-off 5 is connected to energize a pressure sensitive transducer 6 which produces an electrical signal proportional to the amplitude of the pressure. The transducer 6 may include a conventional Wheatstone bridge with a strain gage connected in one of the legs thereof. The use of other conventional types of pressure responsive mechanisms is possible, and will be deemed to fall equally well within the purview of the invention.

The electrical signal produced by the pressure sensitive transducer 6 is applied to a differentiator stage 7. The stage 7 is characterized by the ability to produce an output voltage proportional to the rate of change of the input signal applied thereto. For example, a conventional multi-turn transformer may be used to produce an output secondary voltage which is proportional to the time rate of change of the primary current.

The output of the differentiator stage 7 is applied to a multi-stage transistor amplifier 8. The unit 8 may include a plurality of individual amplifier stages employing paired complementary junction type transistors. The details of the multi-stage amplifier 8 are explained more fully in the portions of this specification which follow.

The electrical output signals from the transistor amplifier 8 are applied to a correctional signal stage 9. In order to maintain the stage 9 in a quiescent state during normally occurring transients in the system, a conventional pulse counting reset circuit may be included therein. The reset circuit is biased, or pre-set in such a manner as to prevent the delivery of any correctional signal from the stage 9, until the frequency of the input pulses delivered thereto exceeds a predetermined adjustable value. This means that the closure rate of the relay contacts illustrated in FIGURE 2 must equal or exceed a definite value before any adjustments are made in the operating conditions of the pressurized conduit. By means of this pulse counting technique, the system is rendered insensitive to normally ordered changes in the operating pressure, and is able to initiate corrective action only for actual conditions of surge or cavitation.

In the preferred embodiment, as above described, the On-Off pulses which reflect the pressure surges are counted. However, it should be appreciated that such pulses may also be readily integrated, grouped, or otherwise referenced with respect to some datum such as time, prior to being utilized to initiate the desired correctional action. For instance, such pulses could be integrated and compared with a standard D.C. voltage within the stage 9, in order to maintain the system quiescent during normally occurring transients. The stage 9 as used in the present feedback control system may assume a variety of equivalent forms. For instance, a frequency meter may be employed in the stage 9. A common type is the heterodyne circuit where a standard frequency is employed to which a test sample is fed giving a resultant beat. Examples of electronic type frequency counters applicable can be found in the following U.S. patents:

2,623,389 to Van Oosterom; December 30, 1952, entitled: Flowmeter.

2,629,008 to Lynch; February 17, 1953; entitled; Frequency Type Telemeter Receiver.

2,761,031 to McDonald; August 28, 1956; entitled: Frequency Sensitive Circuit Control Apparatus.

2,822,688 to Wiley; February 11, 1958; entitled: Flowmeter.

2,905,895 to Gordon; September 22, 1959, entitled: Frequency Meter Circuit.

Another frequency device of a mechanical type can be seen in U.S. Patent No. 2,900,021 to Richtmyer et al.; August 18, 1959; entitled: Electromechanical Timer.

Since several forms of correctional signal may be employed in eliminating the surge condition within the pipeline, it is intended not to limit the invention to any specific form thereof.

Turning now to FIGURE 2, the circuits and components of some of the stages in the present feedback control system are shown in schematic form. More particularly, the pressure sensitive transducer indicated generally by the numeral 6 comprises a conventional Wheatstone bridge. A strain gage 10 is connected in one leg of the bridge. Variations in the pressure within the conduit cause a fluctuating electrical signal to be generated at the opposite corners of the Wheatstone bridge. It will be understood that other conventional types of pressure sensitive transducer may be used equally well in practicing the invention, and will be deemed to fall within the purview thereof.

A differentiator stage 7 in the form of a plural winding transformer is connected to receive and respond to the signals developed across the Wheatstone bridge. The magnitude of the voltage appearing across the secondary winding of the transformer is directly proportional to the time derivative of the current flowing in the primary winding of the transformer. It should be emphasized that other conventional types of differentiating circuits may be employed in place of the transformer, in practicing the invention without departing in any manner from the spirit and scope thereof.

The output signal of the differentiator stage is applied to the multi-stage transistor amplifier 8, which includes four stages of amplification. The first stage of amplification employs a transistor TX–0 connected with a grounded collector in order to present a high impedance load to the input transformer. This method of connection provides a low output impedance for feeding the succeeding stage.

The output voltage from the first stage is applied, via C2, to the base electrode of an NPN transistor TX–1A. The transistor TX–1A is connected as a grounded emitter amplifier. The D.C. bias for the base of this transistor is obtained from a voltage divider consisting of resistors R2 and R3. It will be observed that the junction point between resistors R2 and R3 is connected in common with one plate of capacitor C2 and the base of transistor TX–1A.

A relatively large emitter resistor R4 is connected between ground and the emitter electrode of TX–1A in order to obtain D.C. stability. It will be observed that the resistor R4 is by-passed to ground by a capacitor C4 which is connected in series with a relatively small resistance R7. The collector load forms the input impedance for the grounded collector PNP transistor TX–1B and is therefore relatively high. In practicing the invention, a value of 100,000 ohms or greater for this impedance was obtained.

The emitter electrode of transistor TX–1B is connected to the positive low voltage bus through a resistor R8. The low voltage bus is also connected through resistors R6 and R5 to the direct connection between the collector electrode of TX–1A and the base electrode of TX–1B.

The capacitor C3 is interconnected between the junction point of R6 and R5 and the emitter electrode of TX–1B. The capacitor C3 is designed to provide a very low reactance at the operating frequency and may be regarded as a short circuit for A.C. voltage. The resistors R5 and R6 mentioned above serve to provide the necessary D.C. collector voltage for TX–1B. It will be appreciated that since resistor R5 is effectively connected between the base and emitter electrodes of transistor TX–1B, its only effect on the A.C. operation of the amplifier is to reduce very slightly the input resistance of TX–1B.

The effective emitter load impedance of TX–1B actually includes the parallel circuit containing resistors R6 and R8 combined with the input impedance of the following stage. A degenerative voltage obtained across resistor R7 is fed back to transistor TX–1A through the capacitor C4. The output voltage from TX–1B is coupled to the next stage through the coupling capacitor C5.

The following stages include the paired transistors TX–2A and TX–2B, and TX–3A and TX–3B respectively. Since the method of operation of the individual stages is substantially identical with that of the stage earlier discussed, additional detailed description is deemed unnecessary.

It will be observed that the input signal is coupled to the output stage by capacitor C8, and that the gain of the amplifier may be controlled by varying the feedback control resistor R14 connected just ahead of the output stage. The emitter electrode of transistor TX–3B is connected to the positive high-voltage source through a suitable relay operating coil. The operating bias on the output stage may be adjusted to cause the relay contacts to close on either positive or negative half cycles of oscillation. This repetitive closure of the relay contacts will occur at a time rate governed by the frequency of oscillations within the pressurized conduit.

As earlier disclosed in this patent specification, the sampling of the closure frequency of the relay contacts may be effected by conventional pulse counting reset circuit provided within the correctional signal stage. The reset circuit is, of course, readily adjusted to permit corrective action only upon receipt of a predetermined number of pulses per unit time. This feature of the ingenious feedback control system causes the correctional signal stage to remain quiescent during the non-hazardous transients and normally ordered pressure changes which characterize regular operation.

The use of paired complementary transistors in the multi-stage amplifier of this invention produces certain effects which are conducive to high voltage gain. For instance, the grounded emitter transistor TX–1A provides a high voltage gain by virtue of a large collector load impedance. The grounded emitter transistor TX–1B provides the high load impedance required by TX–1A, while simultaneously providing the low output impedance needed to drive the next stage. Additionally, the degenerative feedback provided by capacitor C4 and resistor R7 serves to stabilize the voltage gain of the amplifier and increases the effective input impedance of transistor TX–1A.

The voltage gain of the transistor amplifier described herein may be taken as the ratio of the voltage across the relay operating coil to the transformer input voltage. In practicing the invention, this voltage gain approximated 120 db or 1,000,000. Although the present system has proven capable of instituting correctional action to terminate either surging or cavitation conditions at frequencies as low as 2 cycles per second throughout the entire range of pressure fluctuations considered destructive to installations, it will be appreciated that the range of sensitive frequencies may be adjusted without departing in any manner from the scope of the invention.

While we have disclosed our invention in such full, clear and concise terms as will enable those skilled in the art to practice and understand it, it will be readily obvious that various modifications, substitutions and alterations may be made therein without departing from the spirit and scope of the appended claims.

What we claim is:

1. In a pressurized fluid transmission conduit, a control system for eliminating harmful pressure oscillations comprising a pressure sensitive transducer connected to sample pressure oscillations within said conduit and develop a voltage proportional to the amplitude thereof, a differentiator stage connected to receive said voltage and produce an output signal related to the rate of change thereof, an amplifier connected to receive said output signal and deliver an enlarged voltage in response thereto, and a correctional signal stage connected to receive said enlarged voltage, said correctional stage being capable of differentiating between ambient pressure oscillations in said conduit and harmful pressure oscillations, and pressure modifying means connected to said correctional stage to receive a signal therefrom whereby to modify the pressure conditioning said conduit.

2. In a pressurized fluid transmission conduit a control system for eliminating harmful pressure oscillations comprising means mounted to sample and develop a voltage related to the amplitude of the oscillations in said conduit, means connected to receive said voltage and produce a signal proportional to the time derivative of said voltage, means including plural semi-conductor means to receive and amplify said signal, and means connected to and responsive to said amplifying means for initiating correctional action to eliminate said harmful pressure oscillations, said responsive means being capable of differentiating between ambient pressure oscillations in said conduit and harmful pressure oscillations and pressure modifying means connected to said responsive means whereby to modify the pressure conditioning said conduit.

3. In a pressurized fluid transmisison conduit a control system for eliminating harmful pressure oscillations comprising a Wheatstone bridge configuration including at least one pressure responsive resistance connected in circuit therewith, a transformer connected to receive signals generated by the occurrence of unbalanced impedances in said configuration, at least one stage of transistor amplification including a pair of direct connected complementary junction type transistors connected for increasing said received signals, responsive means connected to receive said increased signals and being capable of differentiating between ambient pressure oscillations and harmful pressure oscillations in said conduit and pressure modifying means connected to said responsive means whereby to modify the pressure conditioning said conduit.

4. In a pressurized fluid transmission conduit a control system for eliminating harmful pressure oscillations comprising a pressure sensitive transducer connected to sample pressure oscillations within said conduit and develop a voltage proportional to the amplitude thereof, a differentiator stage connected to receive said voltage and produce an output signal related to the rate of change thereof, an amplifier connected to receive said output signal and deliver an enlarged voltage in response thereto, and a correctional signal stage connected to receive said enlarged voltage and initiate a corrective signal to terminate harmful pressure oscillations in the said conduit, said signal stage being capable of differentiating between ambient pressure oscillations and harmful pressure oscillations in said conduit including counting means for maintaining said signal stage quiescent for all input signals below a predetermined frequency applied thereto and pressure modifying means connected to said correctional stage to receive said corrective signal whereby to modify the pressure conditioning said conduit.

5. In a pressurized fluid transmission conduit a control system for eliminating harmful pressure oscillations comprising means mounted to sample and develop a voltage related to the amplitude of said oscillations, means connected to produce a signal proportional to the time derivative of said voltage, means including plural semiconductor means for receiving and amplifying said signal, and means responsive to said amplifying means for initiating correctional signal to eliminate said harmful pressure oscillations, said last mentioned means biased inoperative for all signals below a preset frequency applied thereto, thereby being capable of differentiating between ambient pressure oscillations and harmful pressure oscillations in said conduit and pressure modifying means connected to said correctional stage to receive said correctional signal whereby to modify the pressure conditioning said conduit.

References Cited in the file of this patent

UNITED STATES PATENTS

| | | |
|---|---|---|
| 1,287,062 | McLarty | Dec. 10, 1918 |
| 1,713,833 | Krochendorfer | May 21, 1929 |
| 1,910,202 | Crago | May 23, 1933 |
| 2,026,633 | Haworth | Jan. 7, 1936 |
| 2,259,119 | Stoehr | Oct. 14, 1941 |
| 2,353,201 | Talbot | July 11, 1944 |
| 2,405,670 | Price | Aug. 13, 1946 |
| 2,422,162 | Borell | June 10, 1947 |
| 2,447,388 | Baak | Aug. 17, 1948 |
| 2,474,018 | Sparrow | June 21, 1949 |
| 2,491,372 | Gille | Dec. 13, 1949 |
| 2,491,380 | Kutzler | Dec. 13, 1949 |
| 2,493,476 | Crum et al. | Jan. 3, 1950 |
| 2,606,420 | Moore | Aug. 12, 1952 |
| 2,627,370 | Crum | Feb. 3, 1953 |
| 2,646,931 | Suter | July 28, 1953 |
| 2,761,917 | Aronson | Sept. 4, 1956 |
| 2,762,390 | Rodenacker | Sept. 11, 1956 |
| 2,762,870 | Sziklai | Sept. 11, 1956 |
| 2,790,120 | Ducoff | Apr. 23, 1957 |